United States Patent
Das et al.

(10) Patent No.: US 9,727,575 B2
(45) Date of Patent: Aug. 8, 2017

(54) FILE SYSTEM WITH DATA BLOCK SHARING

(71) Applicant: Microsoft Corporation, Redmond, WA (US)

(72) Inventors: Raj Das, Kirkland, WA (US); William Tipton, Seattle, WA (US); Malcolm Smith, Bellevue, WA (US); Surendra Verma, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 14/474,078

(22) Filed: Aug. 29, 2014

(65) Prior Publication Data

US 2016/0063018 A1    Mar. 3, 2016

(51) Int. Cl.
*G06F 17/30* (2006.01)

(52) U.S. Cl.
CPC .. *G06F 17/30159* (2013.01); *G06F 17/30082* (2013.01); *G06F 17/30088* (2013.01); *G06F 17/30091* (2013.01)

(58) Field of Classification Search
CPC ................................................. G06F 17/30159
See application file for complete search history.

(56) References Cited

U.S. PATENT DOCUMENTS

| | | | |
|---|---|---|---|
| 4,430,725 A | * | 2/1984 | Elliott ................... G06F 17/21 345/530 |
| 7,085,785 B2 | | 8/2006 | Sawdon et al. |
| 7,549,037 B1 | | 6/2009 | Kale et al. |
| 7,562,078 B1 | | 7/2009 | Yadav et al. |
| 7,716,171 B2 | | 5/2010 | Kryger |
| 7,899,795 B1 | | 3/2011 | Kahn et al. |
| 8,195,760 B2 | | 6/2012 | Lacapra et al. |
| 8,250,035 B1 | | 8/2012 | Tang et al. |
| 8,412,688 B1 | | 4/2013 | Armangau et al. |
| 8,566,821 B2 | | 10/2013 | Robinson et al. |
| 2004/0083345 A1 | | 4/2004 | Kim et al. |
| 2012/0271868 A1 | | 10/2012 | Fukatani et al. |

OTHER PUBLICATIONS

"International Search Report and Written Opinion Issued in PCT Patent Application No. PCT/US2015/046624", Mailed Date: Nov. 3, 2015, 11 Pages.

(Continued)

*Primary Examiner* — William Spieler

(57) ABSTRACT

To provide an operation that can quickly copy or rearrange a file, a file system allows stored data to be shared among two or more files or within a file. The file system provides an operation that allows an extent from one file to be copied into an extent of another file, or into a different extent in the same file if the extents do not overlap. To support such an operation, the file system tracks the storage locations for stored data for extents of a file, and whether the stored data for an extent of a file is shared with any other file or by another portion of the same file. When stored data is shared, writing to an extent of a file that refers to the shared stored data invokes a write operation to a new extent on the storage device, and the tracked information for the affected extents is updated.

20 Claims, 6 Drawing Sheets

(56) References Cited

OTHER PUBLICATIONS

"VMFS File Locking and Its Impact in VMware® View™ 5.1", In Technical White Paper, Jan. 31, 2013, 16 pages.
"VMware vCenter Converter Standalone User's Guide", Published on: Oct. 26, 2011 Available at: http://www.vmware.com/pdf/convsa_50_guide.pdf.
Datta, Sudip, "Snap Clone: Instant, Self-Serviced Database-on-Demand", Published on: Mar. 6, 2013 Available at: https://blogs.oracle.com/oem/entry/snap_clone_instant_database_on.
Henter, et al., "Reference Architecture: SAP on IBM eX5 Enterprise Systems, IBM SAN Volume Controller, and IBM Storwize V7000 Storage Systems and VMware", In Proceedings of IBM SAP International Competence Center, Nov. 2011, 38 pages.
Subramanian, Sriram, "Beyond the Block-Based Interface for Flash-Based Storage", In Doctoral Dissertation in Computer Sciences, Retrieved on: Aug. 14, 2014 Available at: http://depot.library.wisc.edu/repository/fedora/1711.dl:7VYJY2FN2Q3TJ8E/datastreams/REF/content.
Al-Kiswany, et al., "VMFlock: Virtual Machine Co-Migration for the Cloud", In Proceedings of the 20th International Symposium on High Performance Distributed Computing, Jun. 8, 2011, 13 pages.
"Second Written Opinion Issued in PCT Application No. PCT/US2015/046624", Mailed Date: Jul. 26, 2016, 5 Pages.
"International Preliminary Report on Patentability Issued in PCT Application No. PCT/US2015/046624", Mailed Date: Nov. 11, 2016, 6 Pages.

* cited by examiner

FILE SYSTEM WITH DATA BLOCK SHARING

BACKGROUND

A file system in a computer generally is part of the operating system that manages access to data in files stored on one or more storage devices. The file system provides an interface through which other applications can create and manage file system objects, write data to files and read data from files stored on the storage devices.

An operation that can be provided by a file system is copying a file. A file can be copied for various purposes. In some instances, a purpose of the copy of the file is to provide a backup copy, which is not intended to be modified, while the original file is subsequently modified. Another purpose is to provide a separately modifiable clone of the original file.

Another operation that can be provided by a file system is rearranging one or more files. For example, data in the file may be arranged in an order that is inefficient for accessing the data. Such rearrangement can be used, for example, if a portion of data in a file is no longer wanted, and a new file is created using only the desired data. As another example, a file can be split into two files. As another example, two files can be joined together.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To provide an operation that can quickly copy or rearrange a file, a file system allows stored data to be shared among two or more files or within a file. The file system provides an operation that allows an extent from one file to be copied into an extent of another file, or into a different extent in the same file if the ranges do not overlap, such that the stored data for the extents of the files are shared.

To support such an operation, the file system tracks storage locations on a storage device for extents a file, and whether the stored data in extents of the storage device are shared among files or within a file. When an extent of a file shares stored data, writing to that extent invokes a write operation that stores the data on a new extent on the storage device. The tracked information about shared stored data for the affected extents on the storage device is updated. File system operations, such as writing and deleting a file system object, can be modified to support sharing of stored data among files or within a file, and to support separate isolated modification of files.

Such sharing of stored data among file system objects allows files, volumes and other file system objects to be quickly copied, cloned, rearranged, and the like, by allowing stored data referenced by one file system object to be referenced by other file system objects.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section describes an example implementation of a computer with a file system.

Figure 1:
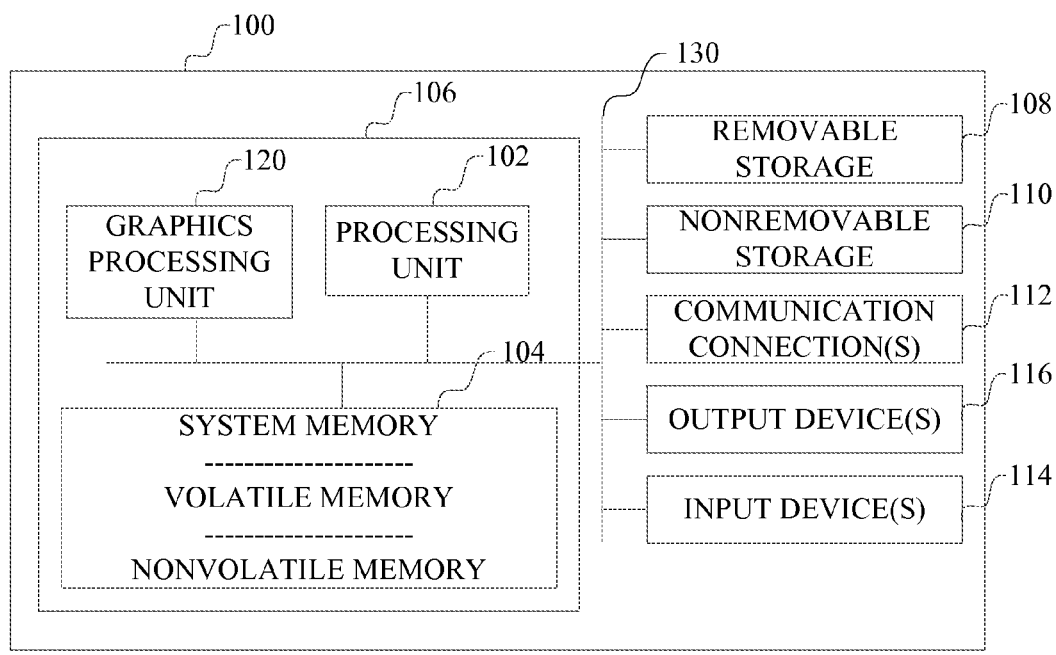
FIG. 1 is a block diagram of an example computer in which a file system can be implemented.

FIG. 1 illustrates an example computer with which a file system can be implemented. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multi-processor systems, microprocessor-based systems, programmable consumer electronics, networked personal computers, minicomputers, mainframe computers, and distributed computing environments that include any of the above types of computers or devices, and the like. A particular example computer is a server computer supporting multiple virtual machines which access data on a storage array with multiple virtual hard drives.

With reference to FIG. 1, an example computer 100 includes at least one processing unit 102 and memory 104. The computer can have multiple processing units 102. A processing unit 102 can include one or more processing cores (not shown) that operate independently of each other. Additional co-processing units, such as graphics processing unit 1020, also can be present in the computer. The memory 104 may be volatile (such as dynamic random access memory (DRAM) or other random access memory device), non-volatile (such as a read-only memory, flash memory, and the like) or some combination of the two. This configuration of memory is illustrated in FIG. 1 by dashed line 106. The computer 100 may include additional storage (removable and/or non-removable) including, but not limited to, magnetically-recorded or optically-recorded disks or tape. Such additional storage is illustrated in FIG. 1 by removable storage 108 and non-removable storage 110. The various components in FIG. 1 are generally interconnected by an interconnection mechanism, such as one or more buses 130.

A computer storage medium is any medium in which data can be stored in and retrieved from addressable physical storage locations by the computer. Computer storage media includes volatile and nonvolatile memory, and removable and non-removable storage media. Memory 104 and 106, removable storage 108 and non-removable storage 110 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. The computer storage media can include combinations of multiple storage devices, such as a storage array, which can be managed by an operating system or file system to appear to the computer as one or more volumes of storage. Computer storage media and communication media are mutually exclusive categories of media.

Computer 100 may also include communications connection(s) 112 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, radio frequency, infrared and other wireless media. Communications connections 112 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

Computer 100 may have various input device(s) 114 such as a keyboard, mouse, pen, camera, touch input device, sensor (e.g., accelerometer or gyroscope), and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, hover, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (such as electroencephalogram techniques and related methods).

The various storage 110, communication connections 112, output devices 116 and input devices 114 can be integrated within a housing with the rest of the computer, or can be connected through input/output interface devices on the computer, in which case the reference numbers 110, 112, 114 and 116 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices and output devices, such as display devices and input devices as shown in FIG. 1. A file system generally is implemented as part of an operating system of the computer, but can be distinct from the operating system. The file system may be practiced in distributed computing environments where operations are performed by multiple computers that are linked through a communications network. In a distributed computing environment, computer programs may be located in both local and remote computer storage media and can be executed by processing units of different computers.

The operating system, file system and applications can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Given one or more computers and one or more storage devices, whether a single computer, or a set of distributed computers, or one or more computers connected to distributed storage, a file system provides an abstraction layer between the details of managing the storage devices, such as the actual storage locations within each device where data is stored, and applications. This abstraction layer allows applications to identify files and access files using references to files and locations within the files, without the need for the application to have information about the actual storage locations on the storage devices or other details about the storage devices.

In some computers, multiple processing units are managed to run multiple virtual machines, where each virtual machine is defined by one or more data files. The storage devices also may be managed to provide multiple virtual hard drives (VHD). Management of virtual machines and virtual hard drives, in a data center for example, regularly involves copying and rearranging data files. For example, data volumes may be copied for backup or other purposes, such as expanding capacity. Virtual machines may be copied so that different instances of the virtual machine can be modified independently. Data files may be rearranged to eliminate unwanted data, to split files or to join files.

By allowing sharing of stored data among files, as described herein, such operations can be performed quickly without reading or writing the stored data, thus reducing the amount of storage space consumed for copies. By allowing sharing of stored data among files, as described herein, such operations also can be performed on individual files or even portions of an individual file.

An implementation of a file system which allows stored data to be shared among two or more files, or within a file, will now be described in more detail.

In a file system, references to files are defined as combinations of various file system objects, such as a name of a storage device or collection of storage devices, names of directories and paths of directories, names of file streams and files, or other types of file system objects. Each file system object generally is a named construct that represents data stored within the file system.

Within the file system, when data for a file is stored, it generally is broken into small chunks (often called blocks) which are stored in storage locations on the storage device. The file system generally tracks, for each file, the storage locations within the storage device where each block of a file is stored, and the ordering of those blocks. A file system also can define clusters, which is a group of blocks, and some operations can be limited to operations performed on clusters instead of groups of blocks.

Some file systems, when writing data in a file, modify the data within the allocated blocks on the storage device for the file. This is called "in-place" writing. Other file systems, when writing data in a file, are configured to use "copy-on-write" or "write-to-new" writing, which involves writing data to a free block of storage in a storage device, then changing the file-to-block mapping to refer to the newly written block, with the overwritten data block being discarded from that file.

In addition to tracking storage locations where stored data for each block of a file is stored, the file system tracks whether the stored data for a block of a file is shared with any other file and/or within the same file. The file system also provides an operation that allows a range of one or more blocks from one file to be copied into range of another file, or into a different range in the same file if the ranges do not overlap. When the stored data for a block is shared, writing to that block invokes a write operation to a new block on the storage device, and the tracked information for the affected blocks is updated. File system operations, such as writing and deleting a file system object, can be modified to support sharing of stored data among files or within a file.

Such sharing of stored data among file system objects allows files, volumes and other file system objects to be quickly copied, cloned, rearranged, and the like, by allowing stored data for blocks of one file system object to be referenced by other file system objects.

An example implementation of such a file system will now be described. In the following description of FIGS. 2 through 8, a block of storage is used as the example granularity of storage operations. It should be understood that the following can be applied to using any form of extent of a while, such as a block, cluster or other subset of storage depending on conventions used by the storage devices, processing units, operating systems and file systems involved.

Figure 2:
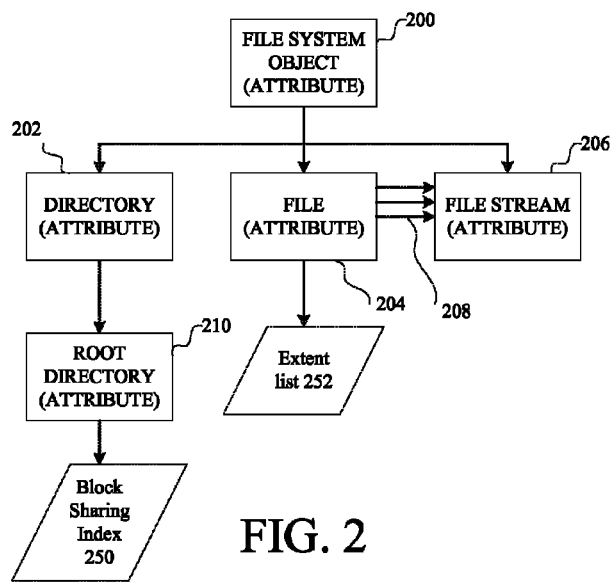
FIG. 2 is a diagram of an example class hierarchy of file system objects.

Referring to FIG. 2 as an example implementation, the file system generally defines a set of different kinds of file system objects 200, such as a directory 202, a file 204 and file streams 206. A file 204 can include a collection of file streams 206 as indicated at 208. For example, a file can include a metadata file stream and a data file stream. A root directory 210 is a special kind of directory 202, providing the top level directory of a volume being managed. The volume governed by the root directory can include a plurality of storage devices or a portion of a storage device, but for illustration purposes only the description herein will refer to singular storage device.

Each file system object also can have one or more attributes, such as a name and other attributes that depend on the implementation of the file system. The attributes of a first file system object can include default settings for other file system objects which are created and dependent on the first file system object. For example, attributes of a directory can define default settings for files and file streams created within that directory. Similarly, attributes of a file can define default settings for file streams included within that file.

A file, file stream or other similar object can also include an extent table 252 that lists, for each extent (such as a cluster or block or other subset of storage) of the file or file stream, various information about that extent, such as its location in storage, and other data. The extent table can be stored in a number of ways. For example, in some implementations, the extent table can be a simple list or array of information about blocks, mapping a virtual block identifier used by the file to a logical block identifier used to refer to a storage location on a storage device. As another example, in some implementations the extent table can be stored in an indexed tree structure such as a B+ tree, using a virtual cluster number as a key and a logical cluster number as a value. Other data, such as attributes of an extent, can be stored for each extent.

While the foregoing describes a file system that has file system objects within an object class hierarchy, other implementations of file systems using other types of data structures to represent file system structures also can be used, and the invention is not limited to the object types described above, or to an object-oriented implementation. The term "file system object" is intended to mean any implementation of a file system structure, such as a root directory, file or the like, depending on the file system, and is not limited to object-oriented implementations.

In general, a file system allows applications and users to create, within a root directory for a storage volume, multiple directories and other file objects within those directories, which creates a directory tree. The name of a storage volume, and the list of names of directories containing a file system object, is called a path. A computer program accesses a file system object through the file system by providing to the file system the path that contains the desired file system object and the name of the file system object. Note that a volume can refer to the storage locations available in a storage device, or in a portion of a storage device, or in multiple storage devices, depending on the implementation.

A file system makes available to other computer programs a variety of operations, typically through a programming interface such as function calls and the like, which operations allow storage to be accessed. A file system may include operations that initialize a storage device (also called a "volume" herein) for use, and operations that create, read, write or update, or delete file objects. A computer program performs operations on a file system object by specifying the operation and the path and name for the file system object on which the operation is to be performed.

To track whether the stored data for a block of a file is shared with any other file or by multiple locations within the same file, as shown in FIG. 2, the file system can include a block sharing index 250 indicating which blocks of storage on the storage device are shared. As an example, such an index can be a list of each shared block. Such an index can be a list of each set of blocks that contains a shared block. If sharing occurs at a granularity larger than a block, such as a cluster or other subset of storage, then the index can be based on the granularity at which sharing occurs. The index can include a reference count indicating the number of times the stored data in the block is shared. The index can be stored as table in memory or storage. The index can be maintained for each volume having such sharing enabled for files in that volume or portion of a volume, as indicated in 250, by storing the index in a manner that associates it with the root directory for a volume.

Figure 3:
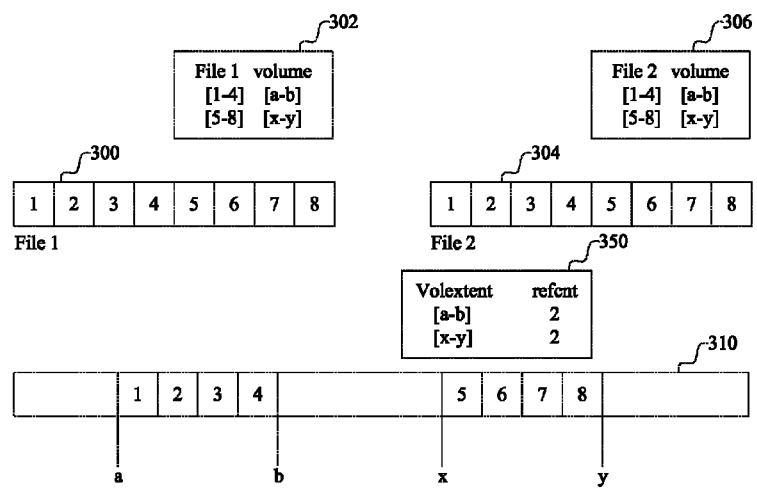
FIG. 3 is a diagram of an example block sharing index.

An example implementation of a block sharing index 250 will now be described in connection with FIG. 3. In FIG. 3, a graphical illustration of a first file 300 indicates a file with eight clusters (numbered 1 through 8). An extent table 302 is provided for the first file 300. This extent table 302 indicates the file clusters 1 through 4 correspond to stored data blocks in the range of "a" to "b" in the volume 310. Similarly, clusters 5 through 8 of the file correspond to stored data blocks in the range of "x" to "y" in the volume. A second file 304 is a copy of the first file, and shares the stored data for all of its data blocks. Thus the location information in the extent table 306 is identical to the location information in the extent table 302. The extent tables 302 and 306 can otherwise be different, for example by storing different attribute information. An index 350 stores information indicating, in this example, for each extent ("volextent"), the number of times ("refcnt") that extent is shared. In this example, the volume range [a-b] is referenced twice (e.g., "2" is the reference count for that range of blocks), and that volume range [x-y] similarly is referenced twice.

Given a file system that enables sharing of stored data by different files or within the same file, various file system operations can be implemented to take advantage of such sharing. For example, copying all or a portion of a file, cloning a file, set of files or even an entire volume, rearranging contents of a file, and the like, all can be accomplished quickly by allowing a file system object to reference the stored data blocks used by other file system objects.

An example of a primitive operation that, in turn, can be used by multiple file system operations to perform more complex sharing operations, is an operation that duplicates an extent of one file into another file. Such an operation can be provided as part of the file system application programming interface, as one of the available file system operations that can be performed on a file system object. The operation is performed using at least a destination file system object, a range in the destination object, a source file system object, and a range within the source file system object.

Figure 4:
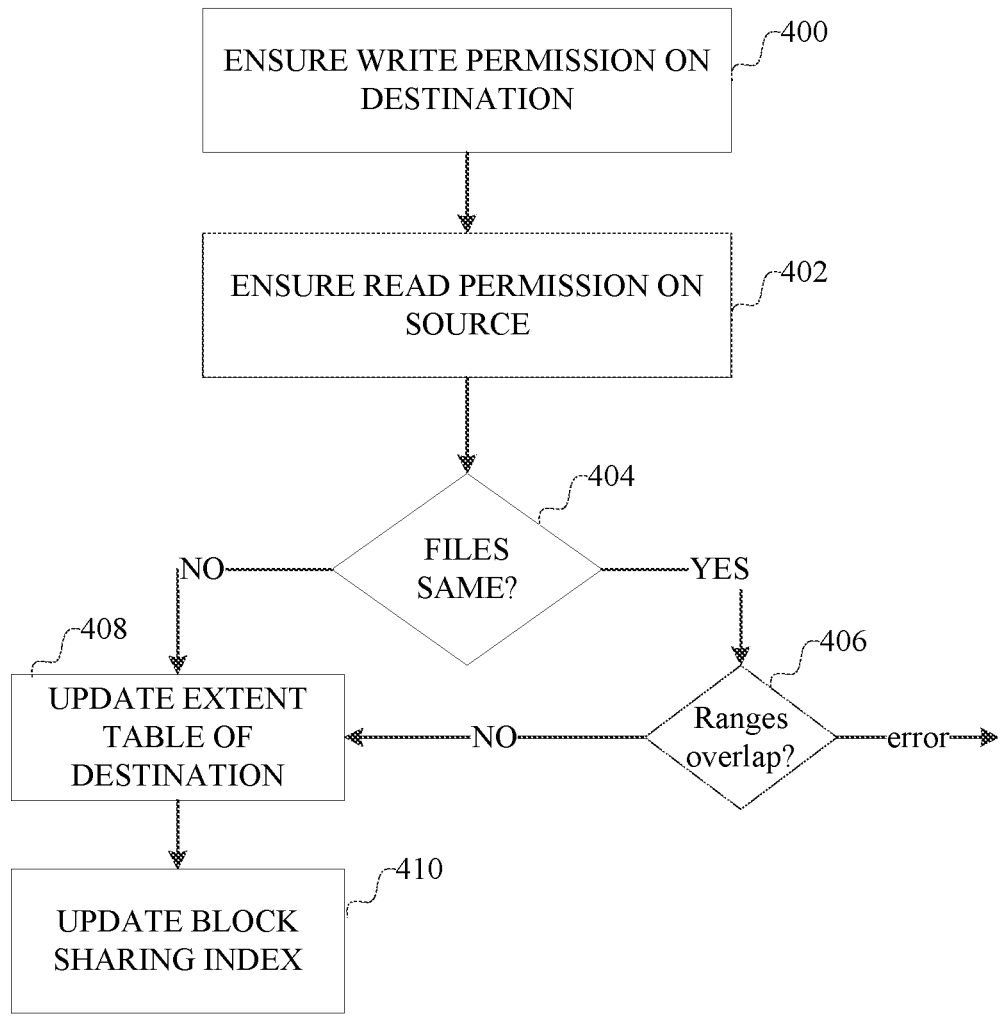
FIG. 4 is a flow chart describing an example implementation of duplicating a range of a file.

As shown in FIG. 4, in response to invoking the command, the file system ensures 400 that the caller has write permission for the destination file system object. The file system also ensures 402 that the caller has read permission for the source file system object. If the source and destination files are the same, as indicated at 404, then the source and destination ranges are compared to ensure that the do not overlap, as determined at 406. If there are otherwise no errors with the input parameters, then the destination file extent table is updated 408 to refer to the stored data for the blocks in the designated range from the source file. A reference count for these stored data blocks is incremented 410 in the block sharing index.

As a specific example of an API command, the following can be provided:

```
typedef struct _DUPLICATE_EXTENTS_DATA {
    HANDLE FileHandle;
    LARGE_INTEGER SourceVcn;
    LARGE_INTEGER TargetVcn;
    LARGE_INTEGER ClusterCount;
} DUPLICATE_EXTENTS_DATA,
  *PDUPLICATE_EXTENTS_DATA;
```

In this example, the "FileHandle" handle is a file handle for the destination file. The "SourceVcn" value is an offset, in clusters, from the beginning of the source file. The "ClusterCount" value is a number of clusters to be duplicated. The "TargetVcn" value is an offset, in clusters, from the beginning of the destination file.

Using such a primitive operation, various other operations can be used to perform higher level copying operations. As an example, a file copy operation can be performed. A destination file can be created or opened to provide a destination file handle. The size of the source file provides the cluster count, and zero is the offset for both the source and destination file. More complex examples are operations implemented by applications that shuffle blocks within one or more files, such as a merging a differential disk of a virtual hard drive. An application analyzes a source file to generate a sequence of a subset of the source data blocks in a new order. After obtaining a destination handle, a sequence of operations can be defined to copy designated blocks from the source file to designated blocks within the destination file to result in the desired new order of blocks. Such copying occurs without reading and writing stored data; instead, the extent table for the destination file refers to the stored data for the block copied from the source file, and the block sharing index is updated to indicate the stored data for these blocks is shared by both the source file and the destination file.

If data files can share stored data blocks, then other operations on file system objects can be affected by the fact that stored data is shared, particularly writing a file and deleting a file. This set of operations is not intended to be exhaustive, but merely illustrative of the kinds of operations that can be implemented differently depending on whether the file system supports sharing of stored data among file system objects.

Figure 5:
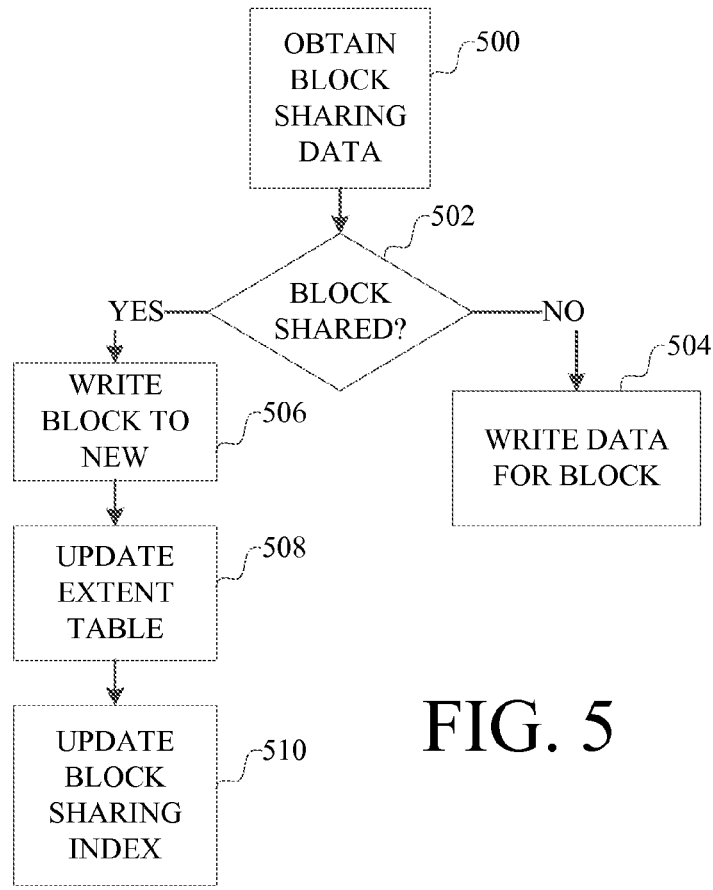
FIG. 5 is a flow chart describing an example implementation of writing data to a file system object.

For example, writing data to a file will now be described in connection with FIG. 5. When data is to be written to a cluster of a file, the block sharing index is checked 500 for each block. If the block sharing index indicates that stored data for the block is not shared, as determined at 502, then the data can be written 504 for that block. In this case, a write in place operation can be used. If the file attributes are set already to perform a "write to new" or "copy on write" operation, then such a write operation can be performed. If the stored data for a block is shared, then a form of "write to new" or "copy on write" or similar operation is initially performed 506 to write the new data for the block of the file to a new block on the storage device. The extent table for the file is updated 508 to refer to the newly written block. However, because the original block of stored data is no longer used by the current file, but was previously shared with another file, the reference count for the original block of stored data is decremented 510 in the block sharing index. If, after the reference count is decremented, the reference count in the block sharing index indicates that the block is no longer shared (e.g., if the reference count is 1), then this block can be removed from the block sharing index.

Figure 6:
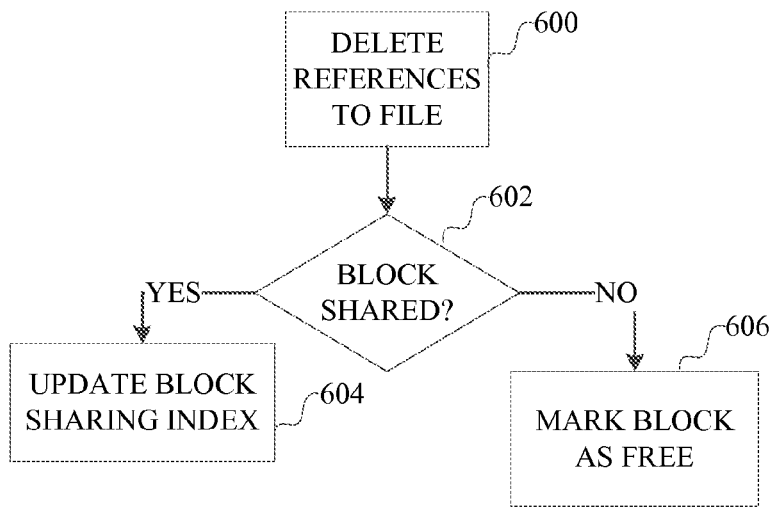
FIG. 6 is a flow chart describing an example implementation of deleting a file system object.

Deleting a file is described in reference to FIG. 6. In FIG. 6, a delete operation generally involves deleting 600 the references to a file system object, including its extent table. Because the stored data for the blocks of the file to be deleted may be shared with other files, before marking a block of storage as "free" in any allocation table within the file system, the block sharing index is checked 602 for this block. If the stored data in the block is not shared, then the block of storage can be marked 606 as free. If the block sharing index includes the block, then the reference count for that block is decremented 604. If, after the reference count is decremented, the reference count in the block sharing index indicates that the stored data in the block is no longer shared, then this block can be removed from the block sharing index.

Using such a file system, fast file copies can be made, which is particularly advantageous, for example, for making backup copies for a variety of purposes. In some cases, a backup file may be larger than the available storage. Large files also would otherwise take a long time to copy. After a backup copy of a file is made, the file may be subsequently modified. By supporting sharing of stored data among files, in combination with copy-on-write or write-to-new files, fast copies can be made even with little available storage, while allowing such backups to be modified. Also, such a file system advantageously supports fast rearranging of data files. For example, if it is recognized that a significant portion of a current file is no longer desired, then a new file can be created which shares the stored data of only the portion of the current file which is desired.

Two example operations of this type will now be described in connection with FIGS. 7 and 8.

Figure 7:
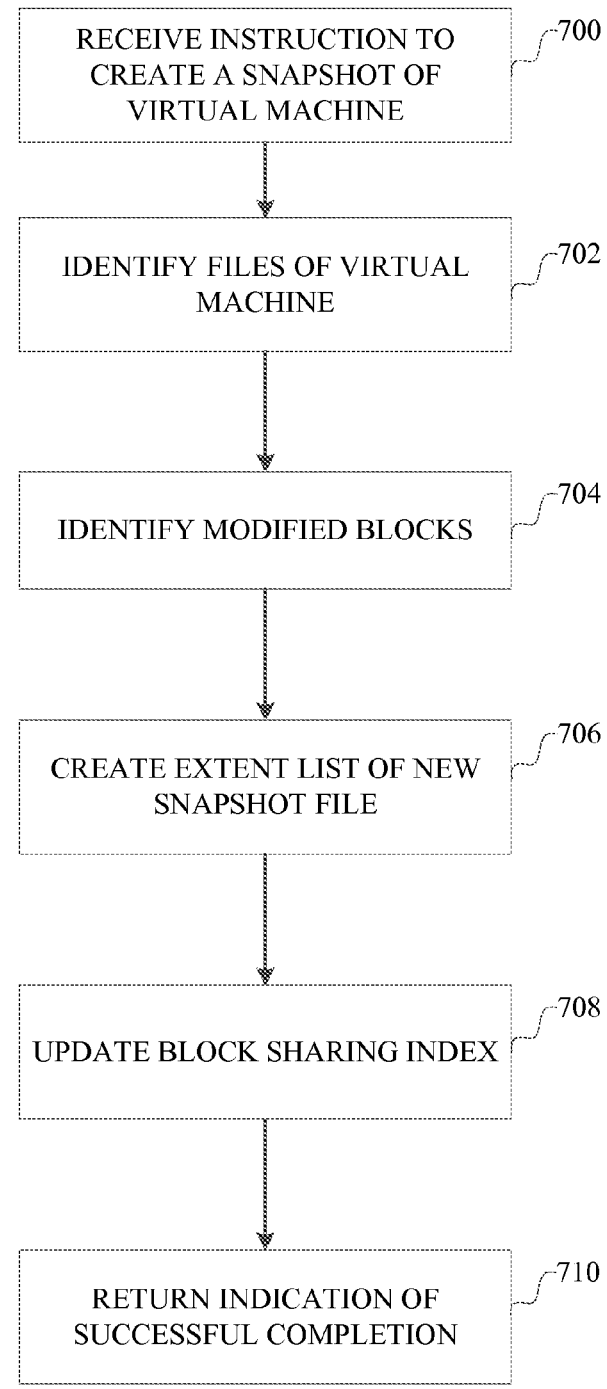
FIG. 7 is a flow chart describing taking a snapshot of a file within a volume.

FIG. 7 describes taking a snapshot of a file, using a virtual machine as an example. Such an operation can be used, for example, to take a snapshot of a single virtual machine within a volume, without cloning the entire volume which may contain a large number of virtual machines. Virtual machines generally map to files, and taking a snapshot of a virtual machine is an operation that can be performed at a file level instead of a volume level. Thus, when a snapshot of a virtual machine is taken, the file system can track only changes related to that snapshot of that virtual machine, without tracking changes to other blocks in files not part of that virtual machine.

Using the file copy operation described above, when a first snapshot is taken of a file, a new file is created with an extent list that is a copy of the extent list of the original file. The new file can be defined as the snapshot that is not changed. Future write operations to the original file can be performed using copy-on-write, or write-to-new, write operations, which modify the extent list of the original file, and the block sharing index. FIG. 7 describes what happens when the next snapshot is taken.

In FIG. 7, the file system receives 700 an instruction to create a snapshot of a virtual machine. The file system identifies 702 one or more files defining the virtual machine. The file system identifies 704 the modified blocks in an identified file. A new snapshot file then is created by creating 706 an extent list that refers to the unmodified blocks from the previous snapshot file and the modified blocks in the identified file, and updating 708 the block sharing index. As an example, the extent list maps virtual block identifiers of the new file to corresponding logical block identifiers of the unmodified blocks from the previous snapshot file and of the modified blocks from the identified file. Such an operation can be performed without reading or writing the actual data blocks from storage. The file system can return 710 an indication that the snapshot is successfully made.

Figure 8:
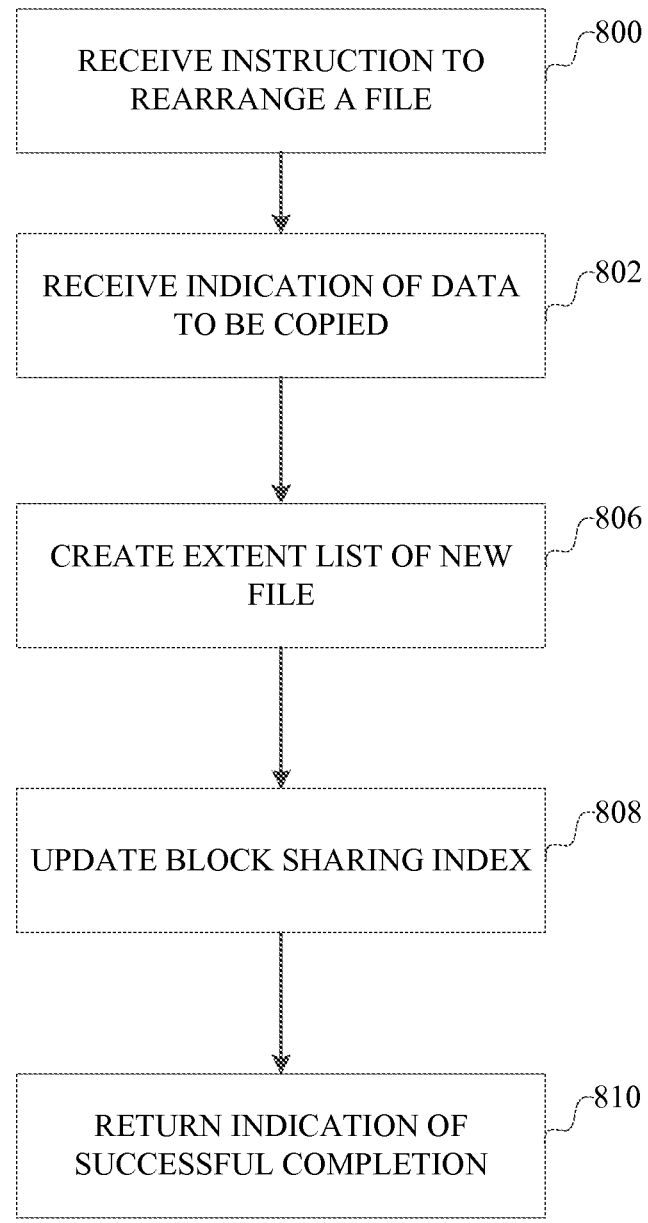
FIG. 8 is a flow chart describing rearranging a file within a volume.

FIG. 8 describes rearranging contents of a file. Such an operation can be used, for example, to manage a virtual hard drive where a portion of a source file is identified as being useful. A new file is created by referencing the desired part of the source file. In FIG. 8, the file system receives 800 an instruction to rearrange the contents of a source file. The file system also receives 802 data indicating the desired data in the source file. This data can be provided in many ways, for example, by user input or application input, or as part of the received instruction or retrieved from memory or storage. The file system then creates the new file by creating 804 an extent list that refers to only the desired blocks in the desired order, and updating 806 the block sharing index. As an example, the extent list of the new file can map virtual block identifiers (of the blocks in the desired order) to the corresponding logical block identifiers of the desired blocks from the source file. Such an operation can be performed without reading or writing the actual data blocks from storage. The file system can return 808 an indication that the file is successfully rearranged.

Accordingly, in one aspect a computer with a file system includes a means for tracking stored data shared by files and a means for writing data for a file to a new extent on a storage device if stored data for the extent to be written is shared with another file. The file system also can include means for copying an extent in a source file to an extent in a destination file such that the source file and destination file share the stored data for the extent.

In another aspect, a computer with a file system includes means for copying an extent of a source file to an extent in a destination file such that the source file and destination file share the stored data on a storage device. The file system can include a means for tracking shared stored data.

In another aspect, a computer with a file system includes a means for making a snapshot of a file, including identifying changes from a previous snapshot of a file, and creating a file that shares stored data for unmodified extents with the previous snapshot of the file. The computer includes a means for tracking and updating information about stored data shared by files based on the snapshot. Such an operation can be performed without tracking changes to other extents in storage that are not part of the file. Such an operation can be performed without reading or writing the stored data for the extents of the file that are copied.

In another aspect, a computer with a file system includes a means for rearranging a source file, including identifying blocks of the source file to be rearranged, and creating a destination file that shares stored data for the identified blocks with the source file. The computer includes a means for tracking information about stored data that is shared among files. Such an operation can be performed without tracking changes to extents in storage that are not part of the source and destination files. Such an operation can be performed without reading or writing stored data for the extents of the source file that are copied to the destination file.

In another aspect, a computer with a file system manages storage of and access to a plurality of file system objects on one or more storage devices. The computer includes a storage medium storing data indicating whether stored data are shared by file system objects. The computer also includes a memory and a processor, with computer program code stored in the memory that, when executed by the processor, configures the processor to respond to requests from applications to access file system objects on the one or more storage devices, wherein writing of data to an extent of a file that shares stored data cause the data to be written to a new extent on the one or more storage devices and the information about shared stored data is updated.

In another aspect, a computer-implemented process includes maintaining information tracking sharing of stored data by data files. If a request to write data to a file is received, whether the file shares stored data with other data files is determined. If the file shares stored data then writing data for an extent that shares stored data causes the data to be written to a new extent on a storage device, and the maintained information about shared stored data is updated.

In another aspect, an article of manufacture includes a storage medium, with computer program code stored in the storage medium that, when executed by one or more computers, configures the one or more computers to maintain data indicating whether stored data are shared by file system objects. The computer can respond to requests from applications to write data to an extent of a file that shares stored data, by writing data to a new extent on a storage device and updating the information about shared stored data.

In any of the foregoing aspects, the data indicating whether stored data are shared can include an index of shared extents. The index can include, for a shared extent, a reference count indicating a number of file system objects sharing the stored data for the extent.

In any of the foregoing aspects, the file system can include a command to copy an extent from a source file to an extent in a destination file such that the source file and the destination file share the stored data for the extent. An application can use the file system command to make a copy of a file. An application can use the file system command to rearrange a file.

In any of the foregoing aspects, taking a snapshot of a file can be performed without tracking changes to other extents in a storage device that are not part of the file.

In any of the foregoing aspects, copying a file or a portion of a file can be performed without reading or writing the stored data from storage for the extents of the file being copied.

In any of the foregoing aspects, a first file that shares stored data with a second file can have an attribute set to cause writes to the first file to write data to a new extent in a storage device.

In another aspect, a file system of a computer receives an indication of a source file from which data is to be copied, the data being stored in storage locations on a storage device. The file system creates a destination file referencing the storage locations on the storage device for the data to be copied and stores data indicating that the data in the storage locations on the storage device are shared by source and destination files.

In any of the foregoing aspects, a destination file can be a snapshot of a source file, wherein the source file has a previous snapshot file. The data to be copied is unmodified data from the previous snapshot file and modified data from the source file. The destination file can be created by referencing the storage locations on the storage device of the unmodified data from the previous snapshot file and modified data from the source file and by updating the data indicating that the data in the storage locations on the storage device are shared by source and destination files and the previous snapshot file.

In any of the foregoing aspects, a destination file can receive rearranged data from a source file. The data to be copied from the source file is identified. The destination file can be created by ordering the identified data in the destination file and referencing the storage locations on the storage device of the identified data, and by updating the data indicating that the data in the storage locations on the storage device are shared by source and destination files.

In any of the foregoing aspects, the file system can confirm successful completion of copying of the data to the destination file.

Any of the foregoing aspects may be embodied in one or more computers, as any individual component of such a computer, as a process performed by one or more computers or any individual component of such a computer, or as an article of manufacture including computer storage with computer program instructions are stored and which, when processed by one or more computers, configure the one or more computers.

Any or all of the aforementioned alternate embodiments described herein may be used in any combination desired to form additional hybrid embodiments. Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. It should be understood that the subject matter defined in the appended claims is not necessarily limited to the specific implementations described above. The specific implementations described above are disclosed as examples only.

What is claimed is:

1. A computer configured by a file system to manage storage of and access to a plurality of file system objects on one or more storage devices, the computer comprising:
   a storage medium storing data, the data indicating whether stored data on the one or more storage devices are shared by file system objects;
   a processing system comprising a memory and a processor, with computer program code stored in the memory that, when executed by the processor, configures the processing system to:
   respond to requests from applications to access file system objects on the one or more storage devices;
   in response to a request to write data to a file system object, determine whether the file system object includes data that is shared based on at least the data stored on the storage medium;
   in response to a determination that the file system object includes data that is shared, write the data to a new extent for the file system object in the one or more storage devices and updating the data indicating whether the stored data on the one or more storage devices are shared; and
   in response to a request to rearrange desired data of a source file system object in a desired order:
      identify the desired data to be copied from the source file system object,
      create a destination file system object including only the identified data in the desired order and referencing storage locations on the one or more storage devices of the identified data used by the source file system object, and
   update the data indicating whether the stored data on the one or more storage devices are shared to indicate that the identified data in the referenced storage locations are shared by the source file system object and the destination file system object.

2. The computer of claim 1, wherein the data indicating whether stored data are shared comprises an index of shared extents.

3. The computer of claim 2, wherein the index includes, for a shared extent, a reference count indicating a number of file system objects sharing the extent.

4. The computer of claim 1, wherein the file system includes a command to copy a range of one or more extents from a source file to a range of extents in a destination file such that the source file and the destination file share the stored data for the range of blocks.

5. The computer of claim 4, wherein an application uses the file system command to make a copy of a file.

6. The computer of claim 4, wherein an application uses the file system command to provide the request to rearrange a file.

7. The computer of claim 1, wherein a first file that shares stored data with a second file has an attribute set to cause writes to the first file to write data to a new extent on the one or more storage devices.

8. A computer-implemented process performed by a file system of a computer, comprising:
  storing data in a storage medium, the data indicating whether stored data on one or more storage devices are shared by file system objects,
  receiving a request to write data to a file system object;
  in response to the request to write data, determining whether the file system object includes data that is shared based on at least the data stored in the storage medium;
  in response to a determination that the file system object includes data that is shared, writing the data to a new extent for the file system object in the one or more storage devices and updating the data indicating whether the stored data on the one or more storage devices are shared; and
  in response to a request to rearrange desired data of a source file system object in a desired order:
    identifying the desired data from the source file system object,
    creating a destination file system object including the identified data in the desired order and referencing storage locations on the one or more storage devices of the identified data from the source file system object, and
    updating the data indicating whether the stored data on the one or more storage devices are shared to indicate that the identified data in the referenced storage locations are shared by the source file system object and the destination file system object.

9. The computer-implemented process of claim 8, wherein the data indicating whether stored data are shared comprises an index of shared extents.

10. The computer-implemented process of claim 9, wherein the index includes, for a shared extent, a reference count indicating a number of file system objects sharing the extent.

11. The computer-implemented process of claim 8, wherein the file system includes a command to copy a range of one or more extents from a source file to a range of extents in a destination file such that the source file and the destination file share the stored data for the range of extents.

12. The computer-implemented process of claim 11, wherein an application uses the file system command to make a copy of a file.

13. The computer-implemented The process of claim 11, wherein an application uses the file system command to provide the request to rearrange a file.

14. The computer-implemented process of claim 8, wherein a first file that shares stored data with a second file has an attribute set to cause writes to the first file to write data to a new extent in a storage device.

15. A computer-implemented process performed by a file system of a computer, comprising:
  the file system storing data, the data indicating whether stored data on one or more storage devices are shared by files;
  the file system receiving an indication of a source file from which desired data is to be rearranged in a desired order;
  identifying the desired data from the source file system object;
  the file system creating a destination file including the identified data in the desired order and referencing the storage locations on the one or more storage devices for the identified data from the source file system object;
  the file system updating the data indicating whether the stored data on the one or more storage devices are shared to indicate that the data in the storage locations on the storage device are shared by the source and the destination files.

16. The computer-implemented process of claim 15, wherein the data indicating whether stored data are shared comprises an index of shared extents.

17. The computer-implemented process of claim 16, wherein the index includes, for a shared extent, a reference count indicating a number of file system objects sharing the extent.

18. The computer-implemented process of claim 15, wherein the destination file is a snapshot of the source file.

19. The computer-implemented process of claim 15, further comprising the file system confirming successful completion of copying of the data to the destination file.

20. The computer-implemented process of claim 15, wherein a first file that shares stored data with a second file has an attribute set to cause writes to the first file to write data to a new extent in a storage device.

* * * * *